May 4, 1954   M. BRENNER   2,677,183
SURVEYING INSTRUMENT
Filed July 21, 1948
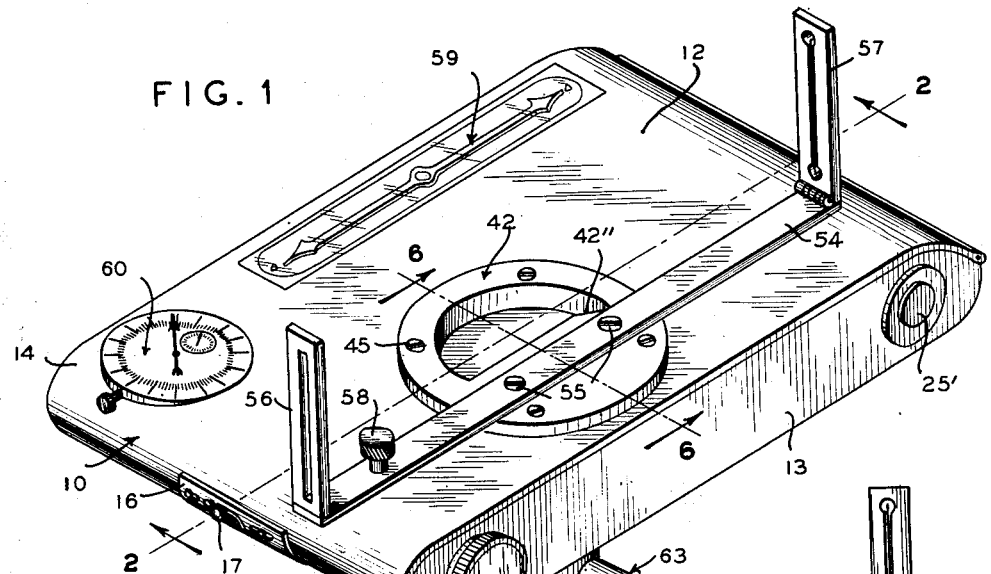
FIG. 1
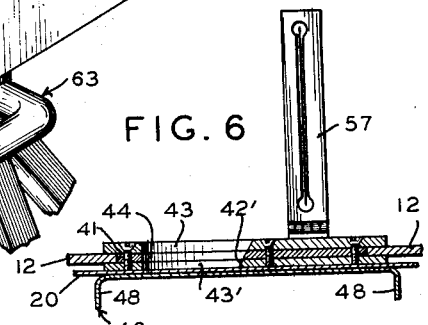
FIG. 6
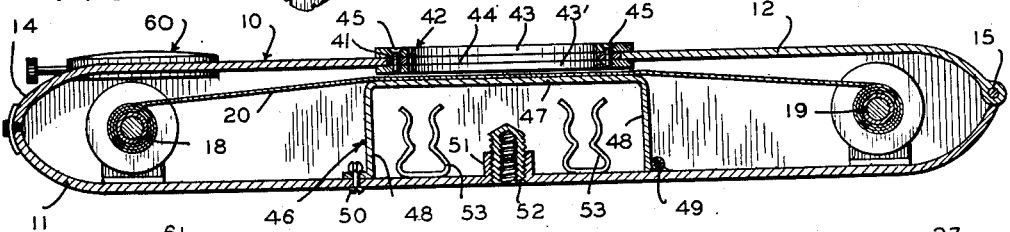
FIG. 2
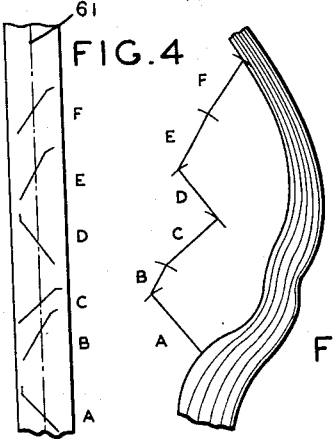
FIG. 4
FIG. 5
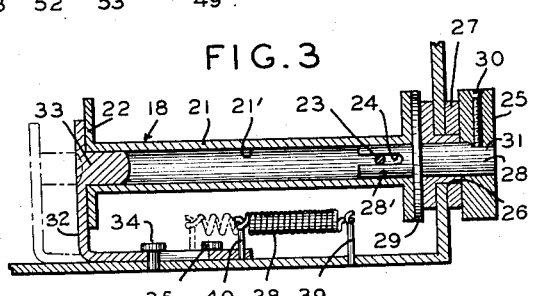
FIG. 3
*INVENTOR.*
MORRIS BRENNER
BY
A. Yates Dowell
ATTORNEY Patented May 4, 1954

2,677,183

UNITED STATES PATENT OFFICE 2,677,183

SURVEYING INSTRUMENT

Morris Brenner, Washington, D. C.

Application July 21, 1948, Serial No. 39,997

6 Claims. (Cl. 33—67)

This invention relates to surveying and more particularly to an instrument which is used for making reconnaissance surveys of land in an expeditious and simple manner and with which a simple non-technical method of reducing the field data to map form may be employed.

Instruments for the making of reconnaissance surveys have been in common use for many years, and these have generally included elements such as a compass or declinator, sighting means, plumb bobs, levels and the like. These instruments, however, have usually been relatively expensive. Those instruments which have been provided at a low cost have usually been unsatisfactory due to inaccuracy of the parts resulting in inaccurate surveys or else they have been difficult and clumsy to operate. Ordinarily, plotting from the data obtained has been relatively difficult, involving the use of mathematics, tables, instruments, and a knowledge of engineering.

Accordingly it is an object of the present invention to provide a simple, inexpensive and light-weight surveying instrument for making reconnaissance surveys.

A further object of the invention is to provide a reconnaissance alidade which may be manufactured at relatively low cost and which is simple and easy to operate and with which relatively accurate reconnaissance surveys may be obtained.

A further object of the invention is to provide a simple, compact instrument with which accurate reconnaissance surveys may be made and in which means is included for measuring and recording the distance covered between stations.

Further objects and advantages of the invention will be apparent from the following specification taken in conjunction with the accompanying drawings, wherein:

Fig. 1 is a perspective of one embodiment of the invention in operative position;

Fig. 2, a section on the line 2—2 of Fig. 1;

Fig. 3, a section illustrating the details of the spool support;

Fig. 4, a sample strip of paper with surveying data thereon;

Fig. 5, a course laid out on a map from the information recorded on the strip shown in Fig. 4; and Fig. 6, a section taken on the line 6—6 in Fig. 1.

Referring to the drawings, a surveying instrument in accordance with the present invention is shown which includes a housing 10 consisting of a base or support 11, a cover 12 and side members 13 and 14 which may be integral with or attached to the base 11. The housing may be substantially rectangular in shape and has its end portions curved as shown to present a more pleasing appearance. The cover 12 is pivotally attached to the base 11 by a hinge 15 of conventional type and a slidable latch 16 attached to the base and a keeper 17 attached to the cover is provided for maintaining the cover in closed position.

Positioned within the housing are spools 18 and 19 for carrying an elongated strip of paper 20 on which the surveying data is to be recorded. The paper is provided with a line 61 which is off-center so that the sense of direction of the paper while surveying may be distinguished even after it is removed from the housing. Each of the spools consists of an elongated cylindrical body portion 21 with a bore 21' and having a flange portion 22 at each end thereof. Within each of the spools at one of its ends, a strut 23 is positioned. Shafts 28 are provided for supporting one end of each of the spools and each has a flange portion 29 for abutting a flange 22 of the spools. A knob 25 is removably attached to the shaft supporting spool 18 outside of the housing 10 by means of a fastener 30 threaded into the knob for contact with a flat portion 31 of the shaft. Each of the shafts has a projection 28' adapted to extend into the bore 21' of the spools, and a groove 24 for receiving the strut 23 of the spools. The shafts 28 are received in apertures 26 in the side 13 of the housing and in each of the apertures 26, a flanged bushing 27 is seated for carrying the shaft 28. No knob is required for the spool 19 and therefore the shaft 28 supporting it may have its exterior end project from the housing sufficiently to be secured by a snap-cap 25'.

For supporting each of the spools at the other end an angle member or clamp 32 having a post or pivot member 33 on one leg is slidably attached to the base 11 by means of headed posts 34 and 35 secured to the base 11 and received in parallel elongated grooves in the other leg of the member 32. Spring members 38 are attached to the base 11 by post 39 at one end of the spring and to the member 32 at the other end of the spring by post 40. The spring is adapted to bias the member 32 to the position shown in Fig. 3 in order to support the spool for normal operation. When it is desired to remove the spool the member 32 may be moved to the position shown in phantom in Fig. 3 in which the post 33 will be out of engagement with the bore 21' of the spool.

For recording data on the strip of paper 20, a circular aperture 41 is provided in the cover 12 of the housing and a rotatable ring member 42 is mounted in the aperture. The ring member consists of upper and lower rings 43 and an intermediate ring 44 having an outside diameter less than that of the rings 43. The rings 42, 43 and 44 are attached together by suitable fasteners 45 in order that the composite ring member 42 may be rotatable in the aperture. An open sector or aperture is provided in each of the rings in order to form a ruling edge consisting of a straight line with an offset portion at one extremity. The size of the sector of the lowermost ring is smaller than that of the intermediate ring which is smaller than that of the upper ring in order to expose the ruling edge 42′ and offset portion 42″ near the paper to facilitate drawing a line along it. The result of assembling the three rings in this manner is to provide a beveled ruling edge, the face of which extends over the three rings. The purpose of the offset portion 42″ on the ruling edge 42′ is to provide a record of the direction of the traverse between points on the survey, and at the same time prevent making an error of 180 degrees in direction when the data is reduced to map form as explained in further detail below.

Positioned within the housing is a support or storage housing 46 consisting of a top wall 47 and end walls 48. The support may be attached at one end to the base 11 by a hinge 49 and secured at the other by a fastener 50. Within the portion of the base 11 covered by the housing 46 is a boss 51 having an internally threaded member 52 secured thereto adapted to receive the upstanding portion or threaded member of a tripod or the like 63.

Attached to the floor of the housing 10 and within the housing 46 on either side of the boss 51 are clips or spool retainers 53 which are adapted to resiliently support and position extra spools within the housing. The housing 46 may also be used to store other items such as pencils and the like.

An elongated sighting bar 54 is attached to the ring member 42 by means of fasteners 55 and its longitudinal axis is parallel to the ruling edge of the ring member. At the ends of the sighting bar open sight alidade members 56 and 57 are pivotally mounted and these are provided in order that the sighting bar and ruling edge of the ring member may be aligned with any bearing of the course that is being surveyed. A lock screw or fastener 58 is threaded through the sighting bar outside of the ring member 42 and is adapted to engage the cover 12 of the housing 10 to prevent movement of the sighting bar and the ring.

A compass or declinator member 59 is seated in an opening in the cover 12 so that its protecting cover or crystal will be substantially flush with the top of the cover 12.

In order that the distance covered between each of the stations on the course may be measured as the course is plotted, a pedometer 60 is seated in the cover 12.

The compass and spools are mounted in the housing so that when the compass is oriented, the longitudinal edges and line 61 of the recording strip will be oriented north-south also. In Fig. 4 of the drawing line 61 is slightly to the left of the center of the strip 20, although the strip is carried by the spools in such manner that line 61 coincides with the ruling edge of the ring member when the ruling edge is positioned longitudinally of the strip.

In order that the compass 59 may accurately indicate directions without influence from other parts of the instrument, it is contemplated that the instrument will be constructed of nonmagnetic materials. The housing for example may be of plastic or wood, the clamp 32 of brass, and the spring 38 of phosphor bronze.

Although not shown in the drawing it is understood that suitable means for leveling the instrument such as a conventional bubble glass may also be employed.

Before adjusting the instrument, spools of paper are operatively positioned within the housing 10 so that the spools may be turned by the use of the knobs 25.

In the operation of the device the instrument is first set up on tripod 63 at the starting point of the initial station and is properly leveled and oriented. When this is done the instrument is locked so that it cannot rotate on the tripod or be easily moved out of its adjusted position. The sighting bar 54 is then released by loosening the fastener 58 and the sights 56 and 57 are opened so that the second point may be properly sighted on.

After the sight is obtained on the second point from the first, the sighting bar is locked in place with the fastener 58 and a line is ruled on the paper adjacent the ruling edge, the paper being supported by the top 47 of the housing 46. The instrument is then moved to the second station and set up for sighting on the third station in the same way. On arrival at the second station and prior to sighting on the third station the reading of the pedometer at the second station is recorded on the strip of paper alongside the pedometer reading made at the first station. The difference between these two readings is the distance between stations one and two. Prior to sighting on the third station the paper, which may be ruled to any desired scale, may be advanced an amount proportional to the distance between stations 1 and 2 as shown by the reading of the pedometer, but the advancement may be otherwise if desired. This procedure is followed all the way through the survey.

At the end of the survey the strip of paper will have marked on it a series of short lines which indicate the bearing from the point at which the sight was taken to the next station or point observed. A strip of this type is shown in Fig. 4 and includes bearing lines taken at the stations A to F inclusive.

In order to reduce the data on the strip to a map the strip is withdrawn from the instrument and attached to a drawing board so that it is parallel to the side edge of the paper on the board with line 61 nearer the left edge of the strip. This procedure orients the drawing paper in accordance with the orientation of the strip of the paper in the instrument during the survey. At a convenient place on the paper depending on the area surveyed and the scale used, a point A is placed to indicate the start of the traverse of the first station. After this is done triangles may be used to draw a line through point A parallel to the line through A on the strip. Then using A as a center, a distance is marked off on the line equal to the distance on the strip between points A and B. This may be done by using a compass and the intersection of the mark with the line from point A is the location of the second point on the map. From point B a similar procedure is followed and so on until the entire map is laid out. By the inspection of each line on the strip map the offset portion indicates the orientation of the line in order that the bearing on the map may not be 180° out of phase.

Although not shown in the drawing, the invention contemplates the use of camera type models, photographic film being used instead of a strip of paper for the purpose of recording field data. In the camera model the open sector in the rotation ring is replaced with a shutter mechanism having a narrow slit opening, and light for recording the bearing is admitted by operating the shutter. Distances can be recorded by writing on the back of the film through the opaque backing paper or by recording in a notebook. Development of the film provides a permanent record of the traverse.

It is apparent that the present invention includes the provision of a simple, compact and inexpensive instrument by means of which a permanent record of a course may be made and the data easily reduced to map form.

It will be obvious to those skilled in the art that various changes may be made in the invention without departing from the spirt and scope thereof and therefore the invention is not limited by that which is shown in the drawings and described in the specification but only as indicated in the appended claims.

What is claimed is:

1. A surveying instrument comprising a hollow relatively flat housing of sheet material and having bottom, side, and top walls, said top wall having a circular aperture covering only a minor portion of said top wall, a support member mounted within the housing beneath the aperture and having a flat top wall disposed adjacent the top wall of the housing, a spool rotatably mounted within the housing at each side of the support member for carrying a supply of sheet material for the recording of data thereon, means for rotating said spools to feed the sheet material from one to the other, a ring member rotatably mounted in said circular aperture, said ring member having a portion of its interior removed and providing a ruling edge, a sighting bar attached to said ring member, and sighting members attached to said sighting bar.

2. The structure of claim 1 further comprising a compass having a narrow elongated housing mounted on the first mentioned housing.

3. The structure of claim 1, the ruling edge of said ring member having an offset portion near one extremity thereof.

4. A surveying instrument comprising a hollow relatively flat housing of sheet material and having bottom, side, and top walls, said top wall having a circular aperture, a support member mounted within the housing beneath the aperture and having a flat top wall disposed adjacent the top wall of the housing and end walls supported on the bottom wall of the housing, a spool rotatably mounted within the housing at each side of the support member for carrying a supply of sheet material for the recording of data thereon, means for rotating said spools to feed the sheet material from one to the other, a ring member rotatably mounted in said circular aperture, said ring member comprising spaced upper and lower rings with the edges of the housing defining the aperture mounted therebetween, said ring member having a portion of its interior removed and providing a ruling edge, a sighting bar attached to said ring member, and sighting members attached to said sighting bar.

5. A surveying instrument comprising a hollow relatively flat housing of sheet material and having bottom, side, and top walls, said top wall having a circular aperture covering only a minor portion of said top wall, a supporting member mounted within the housing beneath the aperture and having a flat top wall disposed adjacent to the top wall of the housing, a spool rotatably mounted within the housing at each side of the support member, a strip of sheet material carried by the spools, said strip having means for indicating over substantially its full length sense of direction along the strip, means for rotating said spools to feed the strip of material from one to the other, a ring member rotatably mounted in said circular aperture, said ring member having a portion of its interior removed and providing a ruling edge, and means attached to the ring member for establishing a line of sight transversely thereof.

6. The structure of claim 5, the sense of direction indicating means along the strip comprising a longitudinal off-center reference line.

References Cited in the file of this patent

UNITED STATES PATENTS

| Number | Name | Date |
| --- | --- | --- |
| 590,696 | Batson | Sept. 28, 1897 |
| 1,196,740 | Palmer | Aug. 29, 1916 |
| 1,579,217 | Kochendorfer et al. | Apr. 6, 1926 |
| 2,029,226 | Etzkorn | Jan. 28, 1936 |
| 2,278,203 | Lepetit | Mar. 31, 1942 |
| 2,280,844 | Page | Apr. 28, 1942 |
| 2,633,639 | Suverkrop | Apr. 7, 1953 |

FOREIGN PATENTS

| Number | Country | Date |
| --- | --- | --- |
| 63,054 | Austria | Jan. 10, 1914 |
| 485,025 | France | Sept. 7, 1917 |
| 576,370 | France | May 10, 1924 |
| 135,505 | Switzerland | Dec. 2, 1929 |